(12) United States Patent
LaCroix et al.

(10) Patent No.: US 10,538,338 B2
(45) Date of Patent: Jan. 21, 2020

(54) METHOD AND SYSTEM FOR MONITORING AIRCRAFT STATUS

(71) Applicant: SITA INFORMATION NETWORKING COMPUTING UK LIMITED, Hayes, Middlesex (GB)

(72) Inventors: Yanik LaCroix, Montreal (CA); Paul Gibson, Hayes (GB)

(73) Assignee: SITA INFORMATION NETWORKING COMPUTING UK LIMITED (GB)

( * ) Notice: Subject to any disclaimer, the term of this patent is extended or adjusted under 35 U.S.C. 154(b) by 0 days.

(21) Appl. No.: 15/578,571

(22) PCT Filed: Jun. 1, 2015

(86) PCT No.: PCT/GB2015/051598
§ 371 (c)(1),
(2) Date: Nov. 30, 2017

(87) PCT Pub. No.: WO2016/193648
PCT Pub. Date: Dec. 8, 2016

(65) Prior Publication Data
US 2018/0155052 A1    Jun. 7, 2018

(51) Int. Cl.
*B64D 45/00* (2006.01)
*H04B 7/185* (2006.01)
*G08G 5/00* (2006.01)

(52) U.S. Cl.
CPC .......... *B64D 45/00* (2013.01); *G08G 5/0013* (2013.01); *G08G 5/0082* (2013.01); *H04B 7/18506* (2013.01)

(58) Field of Classification Search
USPC .......................... 340/459, 945, 961, 963, 979
See application file for complete search history.

(56) References Cited

U.S. PATENT DOCUMENTS 5,748,850 A    5/1998 Sakurai
5,793,639 A    8/1998 Yamazaki
(Continued)

FOREIGN PATENT DOCUMENTS

DE    102009020228 A1    11/2010
DE    102016212150 A1 *  1/2018  ........... B64C 39/024
(Continued)

OTHER PUBLICATIONS

International Search Report and Written Opinion dated May 30, 2016 in International Application No. PCT/GB2015/051598.
(Continued)

*Primary Examiner* — Benyam Haile
*Assistant Examiner* — Mancil Littlejohn, Jr.
(74) *Attorney, Agent, or Firm* — Morris, Manning & Martin, LLP; Daniel E. Sineway, Esq.; Bryan D. Stewart, Esq.

(57) ABSTRACT

A computerised method is provided for monitoring the status of an aircraft. The method comprises sending, from an output module of an aircraft monitoring system, a reporting more report data signal response and monitoring, at an input module of the aircraft monitoring system, for received data signal to the aircraft monitoring system. This sets a contract with the aircraft that may be used to monitor for unexpected behaviour or non-compliance with the contract terms. The method further comprises determining, at a processor of the aircraft monitoring system, if one or more alert criteria have been satisfied by the received data signal responses and generating, at an alerting module of the aircraft monitoring system, an alert based on the determination.

32 Claims, 6 Drawing Sheets

(56) References Cited

U.S. PATENT DOCUMENTS

| | | |
|---|---|---|
| 5,897,620 A | 4/1999 | Walker |
| 6,044,353 A | 3/2000 | Pugliese, III |
| 6,259,405 B1 | 7/2001 | Stewart |
| 6,414,635 B1 | 7/2002 | Stewart |
| 6,553,336 B1 | 4/2003 | Johnson |
| 6,735,630 B1 | 5/2004 | Gelvin |
| 6,736,322 B2 | 5/2004 | Gobburu |
| 6,758,394 B2 | 7/2004 | Maskatiya |
| 6,972,682 B2 | 12/2005 | Lareau |
| 7,027,808 B2 | 4/2006 | Wesby |
| 7,275,689 B2 | 10/2007 | Mak |
| 7,486,171 B2 | 2/2009 | Kim |
| 7,599,847 B2 | 10/2009 | Block |
| 7,612,716 B2 | 11/2009 | Smith et al. |
| 7,647,139 B2 * | 1/2010 | Sandell ............... G08G 5/0013 |
| | | 701/120 |
| 8,229,458 B2 | 7/2012 | Busch |
| 8,467,726 B2 | 6/2013 | Shirakata |
| 8,509,441 B2 | 8/2013 | Yoon |
| 8,521,681 B2 | 8/2013 | Ouchi |
| 8,631,358 B2 | 1/2014 | Louch |
| 8,665,238 B1 | 3/2014 | Gossweiler, III |
| 8,949,142 B1 | 2/2015 | Angrish |
| 8,977,568 B1 | 3/2015 | Schattauer |
| 9,024,752 B2 | 5/2015 | Tumayan |
| 9,026,461 B2 | 5/2015 | Calman |
| 9,047,512 B2 | 6/2015 | Otis |
| 9,134,955 B2 | 9/2015 | Healey |
| 9,141,325 B2 | 9/2015 | Dersy |
| 9,239,246 B2 | 1/2016 | Jones |
| 9,275,550 B1 | 3/2016 | Stefani |
| 9,541,632 B2 | 1/2017 | Frank |
| 9,552,564 B1 | 1/2017 | Martenis |
| 9,589,262 B2 | 3/2017 | Graylin |
| 9,589,405 B2 | 3/2017 | Cabouli |
| 9,599,989 B1 | 3/2017 | Brown |
| 9,710,920 B2 | 7/2017 | Utsunomiya |
| 9,749,831 B2 | 8/2017 | Lee |
| 2003/0130771 A1 | 7/2003 | Crank |
| 2004/0267412 A1 * | 12/2004 | Arnouse ............ B64D 45/0015 |
| | | 701/2 |
| 2005/0258230 A1 | 11/2005 | Wiater |
| 2009/0266882 A1 | 10/2009 | Sajkowsky |
| 2010/0174424 A1 * | 7/2010 | Cornell ................. G01C 23/00 |
| | | 701/9 |
| 2011/0137998 A1 * | 6/2011 | Judd .................... G08G 5/0013 |
| | | 709/206 |
| 2011/0144897 A1 * | 6/2011 | Dunsky .................... G08G 5/00 |
| | | 701/122 |
| 2012/0041313 A1 | 2/2012 | Tanaka |
| 2013/0085661 A1 | 4/2013 | Chan et al. |
| 2013/0191631 A1 * | 7/2013 | Ylonen ............... H04L 63/1483 |
| | | 713/153 |
| 2013/0197725 A1 | 8/2013 | O'Dell et al. |
| 2014/0223043 A1 | 8/2014 | Dersy |
| 2014/0229093 A1 | 8/2014 | Judy et al. |
| 2015/0081138 A1 | 3/2015 | Lacko et al. |
| 2016/0152350 A1 | 6/2016 | Puentes |
| 2016/0176538 A1 * | 6/2016 | Bekanich ............... B64D 45/00 |
| | | 701/14 |
| 2016/0180255 A1 | 6/2016 | Goedemondt |
| 2017/0004444 A1 | 1/2017 | Krasko |
| 2017/0032263 A1 | 2/2017 | Yuan |
| 2018/0005533 A1 * | 1/2018 | Lohmiller ............. B64C 39/024 |

FOREIGN PATENT DOCUMENTS

| | | |
|---|---|---|
| EP | 1308864 A1 | 5/2003 |
| EP | 0770546 B1 | 12/2003 |
| EP | 2693418 A2 | 2/2014 |
| EP | 2693419 A2 | 5/2014 |
| EP | 2932902 B1 | 12/2016 |
| EP | 1872294 B1 | 11/2017 |
| GB | 2445097 A | 6/2008 |
| GB | 2475593 A | 5/2011 |
| JP | 2003157984 A | 5/2003 |
| JP | 2017129981 A | 7/2017 |
| RU | 2013107571 A | 8/2014 |
| WO | 2011017812 A1 | 2/2011 |

OTHER PUBLICATIONS

Search Report issued in Singapore Application No. 11201709244Y, dated Jul. 9, 2018; 2 pages.

Notification of Transmittal of the International Search Report and the Written Opinion of the International Searching Authority, or the Declaration, issued in International Application No. PCT/GB2015/051598, dated May 30, 2016; 23 pages.

Search Report issued by the Federal Service on Intellectual Property in Application No. 2017144430 dated Jan. 16, 2019 (2 pages).

* cited by examiner

METHOD AND SYSTEM FOR MONITORING AIRCRAFT STATUS

CROSS REFERENCE TO RELATED APPLICATIONS

This application is a national phase application of, and claims benefit of and priority to International Application No. PCT/GB2015/051598, filed Jun. 1, 2015, entitled "Method and System for Monitoring Aircraft Status," the disclosure of which is incorporated herein by reference as if set forth herein in its entirety.

FIELD OF THE INVENTION

The present invention relates to a method and system for monitoring the status of an aircraft. In particular, the invention relates to a method and system for alerting based on monitored communications that are expected to be received from an aircraft.

BACKGROUND TO THE INVENTION

Current aircraft monitoring systems typically use aircraft communications addressing and reporting system (ACARS) data in combination with radar data in order to track the progress of aircraft. This data may be used by air traffic controllers or alternatively provided as a service to aircraft operators.

In the ACARS system, each aircraft is fitted with a VHF transceiver for providing a data link between the aircraft on-board equipment and ground equipment. This data link may be provided through a direct transmission from the aircraft to a ground station, or alternatively the aircraft may transmit the data to a satellite, which then forwards the data to a satellite ground station. These transmissions are received at the ground stations by a data link service provider that then routes the data to the air traffic controllers or aircraft operators.

The periodicity within which a given aircraft will emit ACARS data transmissions is configured by the operating airline and is typically in the order of ten to twenty minutes. This is generally determined in order to provide a balance between receiving up to date data and the per message costs associated with the data transfer. This periodicity is set by appropriately programming the on-board avionics during maintenance of the aircraft and cannot be changed during a flight.

In view of this relatively long period between consecutive ACARS message transmissions, significant distances can be covered by an aircraft between the transmissions, which can in turn lead to an uncertainty in the estimated position and path of an aircraft. Furthermore, the time stamp for any given ACARS transmission is only accurate to within a minute and the position data is reported within an accuracy of three decimal places.

If the aircraft is forced to circle in a given area of airspace, for example, in an airport holding pattern, this will not be immediately apparent from the ACARS data as the aircraft will likely have performed a full circle by the time a subsequent ACARS transmission is carried out. This can lead those monitoring the ACARS data to be unsure as to whether these data transmissions are erroneous or if the aircraft truly has remained in a given area of airspace between subsequent ACARS transmissions.

Increasing the standard frequency (i.e. reducing the period between consecutive transmissions) of ACARS messaging, as programmed into the aircraft's avionics during maintenance, would provide a more up to date set of position data. However, if each airline were to do this as a standard across the board then a large burden would be placed on the ACARS network, since it is a one-to-one digital data link system. This may overload the network and reduce its reliability and accuracy.

Airspace across the world is split up into a number of three-dimensional (3D) blocks of space known as sectors. Each sector has one or more air traffic controllers that communicate with and are responsible for the safety of aircraft operating in, or about to enter, that airspace sector. These controllers work for Air Navigation Service Providers (ANSPs) and are trained to manage the aircraft such that there is a safe and orderly flow of aircraft from point to point in the most efficient manner.

In order to achieve this, air traffic controllers communicate with aircraft to give active support and authorisations as well as to receive information from the aircraft. Usually this communication is carried out over voice radio such as radio transmissions in the VHF or HF bands. One issue with voice radio is that only one transmission can be made on a given frequency at a given time and so, even if there is a strong radio signal, transmissions may be cut off or become unintelligible. In order to ensure that transmissions are accurately received, it is necessary to read back the communication, which also increases the time it takes for a given communication to be completed.

Furthermore, voice communications can be subject to misunderstandings or language barriers, voice quality can be low, and VHF voice frequencies are subject to high traffic congestion. To combat these negative aspects, a committee was set up to establish a new system, the Future Air Navigation System (FANS), to improve these communications, for example by using a data link system to encapsulate messages between the ANSP and the aircraft.

A number of standard format communications have been determined than can be used to send common commands such as level or altitude assignments, crossing constraints, lateral deviations, route changes and clearances, speed assignments, radio frequency assignments, and various requests for other information, with the option of a free-text message for communications that fall outside of the standard list of common commands or responses.

These communications are commonly known as a Controller-Pilot Data Link Communications (CPDLC) and they eliminate the need to validate communications by multiple transmissions and reading back as both parties can see the communication in text form and the communications are available on demand such that they can be easily reviewed later or printed.

These data link messages are commonly encapsulated and transmitted using the Aircraft Communications Addressing and Reporting System (ACARS) protocol. Aircraft using ACARS may be fitted with a VHF and/or HF transponder for providing a data link between the aircraft on board equipment and ground station equipment. This data link may be provided through a direct transmission from the plane to the ground, or alternatively through a microwave transmission via a satellite. These transmissions are received at the ground by a data link service provider and then routed to aircraft operators by the data link service provider for a charge per message. Messages transmitted from the aircraft to a ground system may be referred to as downlink messages and messaged transmitted from a ground system to the aircraft may be referred to as uplink messages.

Another aspect of FANS is the ability to set up an Automatic Dependent Surveillance Contract (ADS-C). ADS-C uses the FANS avionics systems that are a part of the on-board Flight Management Systems (FMS) of FANS equipped aircraft to automatically provide information such as the aircraft's position, altitude, speed, intent and meteorological data to users such as ANSPs or airlines. At a minimum the ADS-C message will contain three-dimensional position information, the timestamp corresponding to the position information and a figure of merit (FOM) that indicates the accuracy of the position data.

The contract is defined by the ground system of the end user and may indicate that communications should be sent from the aircraft to the end user's ground systems in response to specified periodic, or demand based, or event based criteria or a combination of these criteria. Up to five separate ground systems are able to maintain ADS contracts with a given aircraft and, currently, these ADS-C connections are typically used by the air traffic controllers of ANSPs that have FANS enabled ground systems to reduce the reliance on voice channel dialogues between the pilot of an aircraft and the air traffic controller, which in turn reduces the workload of both the controller and the pilot and allows the separation between respective aircraft to be reduced.

The ANSP may determine the data link capabilities of a given aircraft by exchanging Air Traffic Service Facilities Notification (AFN) messages with the aircraft. These messages may also include the address information that allows a subsequent FANS session to take place.

In the past, airlines have relied on the reports issued by air traffic controllers and only used passive means for monitoring the status of their aircraft. It has been appreciated by the applicant that a proactive system for airlines to monitor the status of their aircraft that can be developed quickly and implemented using an aircraft's existing equipment is desirable.

SUMMARY OF THE INVENTION

According to a first aspect of the invention, a computerised method is provided for monitoring the status of an aircraft. The computerised method comprises sending, from an output module of an aircraft monitoring system, a reporting contract request to the aircraft's avionics, the reporting contract request defining one or more report criteria upon which the aircraft's avionics are required to provide a data signal response to the aircraft monitoring system; receiving, at an input module of the aircraft monitoring system, the data signal responses sent from the aircraft's avionics to the aircraft monitoring system; determining, at a processor of the aircraft monitoring system, if one or more alert criteria have been satisfied by received responses; and generating, at an alerting module of the aircraft monitoring system, an alert based on the determination.

Advantageously, this embodiment provides a method whereby a reporting contract, such as an ADS contract, may be initiated with an aircraft and intelligent alerting may be provided based on the reporting contract messages.

Preferably, the report criteria may define a first interval at which the aircraft's avionics are required to provide a data signal response, the alert criteria may define a second interval and an alert may be generated, at the alerting module of the aircraft monitoring system, in the absence of a required data signal response being received during the first or second interval. This advantageously provides a method that may automatically alert to the user that an expected periodic reporting contract response message has not been received. The user may then investigate the situation to determine if further action is needed.

Optionally, the report criteria may indicate that an immediate data signal response is required from the aircraft's avionics and the alert may be generated, at the alerting module of the aircraft monitoring system, in the absence of a data signal response being received within an interval defined by the alert criteria. Furthermore, the one or more report criteria or the one or more alert criteria may be received from a criteria database and the data signal responses may comprise aircraft location information corresponding to the aircraft.

In one embodiment, the input module is configured to receive flight plan data and ACARS data corresponding to the aircraft and an alert is generated, at the alerting module, if it is determined that a flight phase change message corresponding to the aircraft has been received but flight plan data corresponding to the aircraft has not been received. This provides an alert if an aircraft is about to or has taken off but the flight plan corresponding to that aircraft's flight has not been received by the system. This is desirable because the absence of flight plan data for the aircraft will mean that some other alerting functions may not be available for the flight until a relevant flight plan data is provided.

The computerised method may include receiving, at the input module, flight plan data corresponding to the aircraft and generating an alert, at the alerting module, if the aircraft location information is determined to deviate vertically or laterally from the flight plan data by a given amount. This will alert the end user to a change in course of the aircraft that may require further investigation to determine if the unexpected behaviour of the aircraft is of concern. This aids users who may be monitoring a large number of aircraft by bringing their attention to specific aircraft that may need consideration in view of the unexpected change in the flight path.

Furthermore, the method may optionally comprise receiving, at the input module, Controller-Pilot Data Link Communications (CPDLC) messages corresponding to the aircraft and generating an alert by the alerting module if the deviation from the flight plan data is determined, by the processor, not to be authorised in the content of the CPDLC messages. This enables the method to determine if an unexpected deviation is the result of correspondence between the controller and the pilot, in which case the alert may not be necessary, or if further investigation is still required. This aids a user by reducing the number of alerts that may be generated, and need to be reviewed, in situations where a controller has authorised or instructed a change in the aircraft's route that would otherwise be unexpected.

The computerised method may generate an alert, at the alerting module, if the aircraft is determined or estimated to intersect a given region of airspace based on current aircraft location information or flight plan data. This region of airspace may be determined by a user selection or by a weather alert. Advantageously, this allows the computerised method to automatically alert the end user if the aircraft is estimated to have entered, or have already entered, undesirable airspace, such as a war zone, a region containing a volcanic ash cloud or another bad weather region.

Preferably, an alert is generated, at the alerting module, if it is determined, at the processor, that a received data signal response is an emergency report or a connection denial message. The reporting contract request and the corresponding data signal responses preferably conform to an Automatic Dependent Surveillance Contract.

In one embodiment, the computerised method further comprises receiving, at the input module, Controller-Pilot Data Link Communications (CPDLC) messages corresponding to the aircraft storing the CPDLC messages in a data store and providing the CPDLC messages to a user upon a user request. The alerts that have been generated may also be stored in a data store and are provided to a user upon a user request. This advantageously helps a user to establish if the event that led to the generation of the alert was discussed between the pilot of the aircraft and an ANSP controller.

The computerised method according to the first aspect of the invention may further comprise receiving, at the input module, Air Traffic Services Facilities Notification (AFN) messages corresponding to the aircraft; determining, at the processor, if one or more AFN message criteria have been satisfied by the received AFN messages; and generating, at the alerting module, an alert based on the determination.

Alternatively, a computerised method may be provided for monitoring the status of an aircraft comprising receiving, at the input module, Air Traffic Services Facilities Notification (AFN) messages corresponding to the aircraft; receiving, at the input module, aircraft location information corresponding to the aircraft; determining, at a processor, if one or more AFN message criteria have been satisfied by the received AFN messages; and generating, at the alerting module, an alert based on the determination and the aircraft location information.

Preferably, the processor may determine if AFN message criteria identifying a time period for receiving a FANS logon confirmation message have been satisfied and cause an alert to be generated, at the alerting module, if the FANS logon confirmation message is not received after the aircraft has been in FANS enabled airspace for the identified time period. This will highlight to an end user, such as an airline operator, that there has been an unexpected loss of contact between their aircraft and the FANS ground system of an ANSP.

Optionally, the processor may determine if AFN message criteria identifying a time period for receiving a FANS logon confirmation message have been satisfied and cause an alert to be generated, at the alerting module, if the FANS logon confirmation message is not received within the identified time period from an AFN contact advisory message having been sent to the aircraft. This advantageously highlights to an end user that a FANS handover between two ANSPs has not been successful and that further investigation of the aircrafts status may be desirable in order to eliminate any gaps between ANSP tracking of the aircraft.

According to a second aspect of the invention, a system is provided for monitoring the status of an aircraft. The system comprises an output module configured to send a reporting contract request to the aircraft's avionics, wherein the reporting contract request defines one or more report criteria upon which the aircraft's avionics are required to provide a data signal response to the system; an input module configured to receive data signal responses sent from the aircraft's avionics to the system; a processor configured to determine if the one or more alert criteria have been satisfied by received data signal responses; and an alerting module configured to generate an alert based on the determination.

This advantageously provides a system that can initiate a reporting contract, such as an ADS contract, with an aircraft and provide intelligent alerting based on the criteria of the reporting contract and the content of the reporting contract messages that are, or are not, received.

Preferably, the report criteria defines a first interval at which the aircraft's avionics are required to provide a data signal response, the alert criteria defines a second interval and the alerting module is configured to generate an alert in the absence of a required data signal response being received during the first or second interval defined by the criteria such that a user is automatically alerted that an expected periodic reporting contract data signal response message has not been received. Optionally, the report criteria may indicate an immediate data signal response is required from the aircraft's avionics and the alerting module may be configured to generate an alert in the absence of a response, within an interval defined by the alert criteria.

In a preferred embodiment, the data signal responses that the input module is configured to receive comprise aircraft location information corresponding to the aircraft. Furthermore, the input module may be further configured to receive flight plan data and ACARS data corresponding to the aircraft and the alerting module may be configured to generate an alert if it is determined that a flight phase change message corresponding to the aircraft has been received but flight plan data corresponding to the aircraft has not been received. This provides an alert if an aircraft is about to or has taken off but the flight plan corresponding to that aircraft's flight has not been received by the system. This is desirable because the absence of flight plan data for the aircraft will mean that some other alerting functions may not be available for the flight until a relevant flight plan data is provided.

Optionally, the input module may be configured to receive flight plan data corresponding to the aircraft and the alerting module may be configured to generate an alert if the processor determines that the aircraft location information indicates that the aircraft has deviated vertically or laterally from the flight plan data by a given amount.

Preferably, the input module is further configured to receive Controller-Pilot Data Link Communications (CPDLC) messages corresponding to the aircraft and the alerting module is further configured to generate the alert only if the deviation from the flight plan data is determined by the processor to not be authorised in the content of the CPDLC messages. In this manner, the number of alerts that are generated by the system may be reduced such that the end user can focus on the generated alerts that may require further investigation to verify the status of the monitored aircraft.

Where the input module is configured to receive flight plan data corresponding to the aircraft, the alerting module may be configured to generate an alert if the processor determines or estimates that the aircraft will intersect a given region of airspace based on the flight plan data. The definition of the given region of airspace may be received from a user selection or may be a bad weather alert.

The alerting module of the system may be configured to generate an alert if the processor determines that a received data signal response is an emergency report or if the data signal response to the reporting contract request is determined by the processor to be a connection denial message.

The input module of the system may be further configured to receive Controller-Pilot Data Link Communications (CPDLC) messages corresponding to the aircraft and the processor may be configured to store the CPDLC messages in a data store such that they can be provided to a user upon a user request. This enables a user investigating an alert to obtain additional information regarding the context of the aircraft's status around the time that the alert conditions were noted.

Preferably, the reporting contract requests that the output module is configured to send and the corresponding responses that the input module is configured to receive will conform to an Automatic Dependent Surveillance Contract. The system may further comprise a data store, wherein the processor is further configured to store the alerts that have been generated in the data store and to provide the alerts that have been generated to a user upon a user request.

The input module of the system according to the second aspect of the invention may further be configured to receive Air Traffic Services Facilities Notification (AFN) messages corresponding to the aircraft and the alerting module may be configured to generate an alert if the processor determines that an AFN confirmation message has not been received when expected based on the aircraft location information.

Alternatively, a system for monitoring the status of an aircraft may be provided comprising an input module configured to receive Air Traffic Services Facilities Notification (AFN) messages corresponding to the aircraft and aircraft location information corresponding to the aircraft; a processor configured to determine if one or more AFN message criteria have been satisfied by the received AFN messages; and an alerting module configured to generate an alert based on the determination and the aircraft location information.

Preferably, the AFN message criteria identify a time period for receiving a FANS logon confirmation message and the alerting module is configured to generate an alert if the FANS logon confirmation message has not been received after the aircraft has been in FANS enabled airspace for the identified time period. This will highlight to the user, such as an airline operator, that there has been an unexpected loss of contact between their aircraft and the FANS ground system of an ANSP.

Optionally, the AFN message criteria may identify a time period for receiving a FANS logon confirmation message and the alerting module may be configured to generate an alert if the FANS logon confirmation message has not been received within the identified time period from an AFN contact advisory message having been sent to the aircraft. This advantageously highlights to an end user that a FANS handover between two ANSPs has not been successful and that further investigation of the aircrafts status may be desirable.

BRIEF DESCRIPTION OF THE DRAWINGS

Embodiments of the invention will now be described, by way of example only, and with reference to the accompanying drawings, in which.

DETAILED DESCRIPTION

Figure 1:
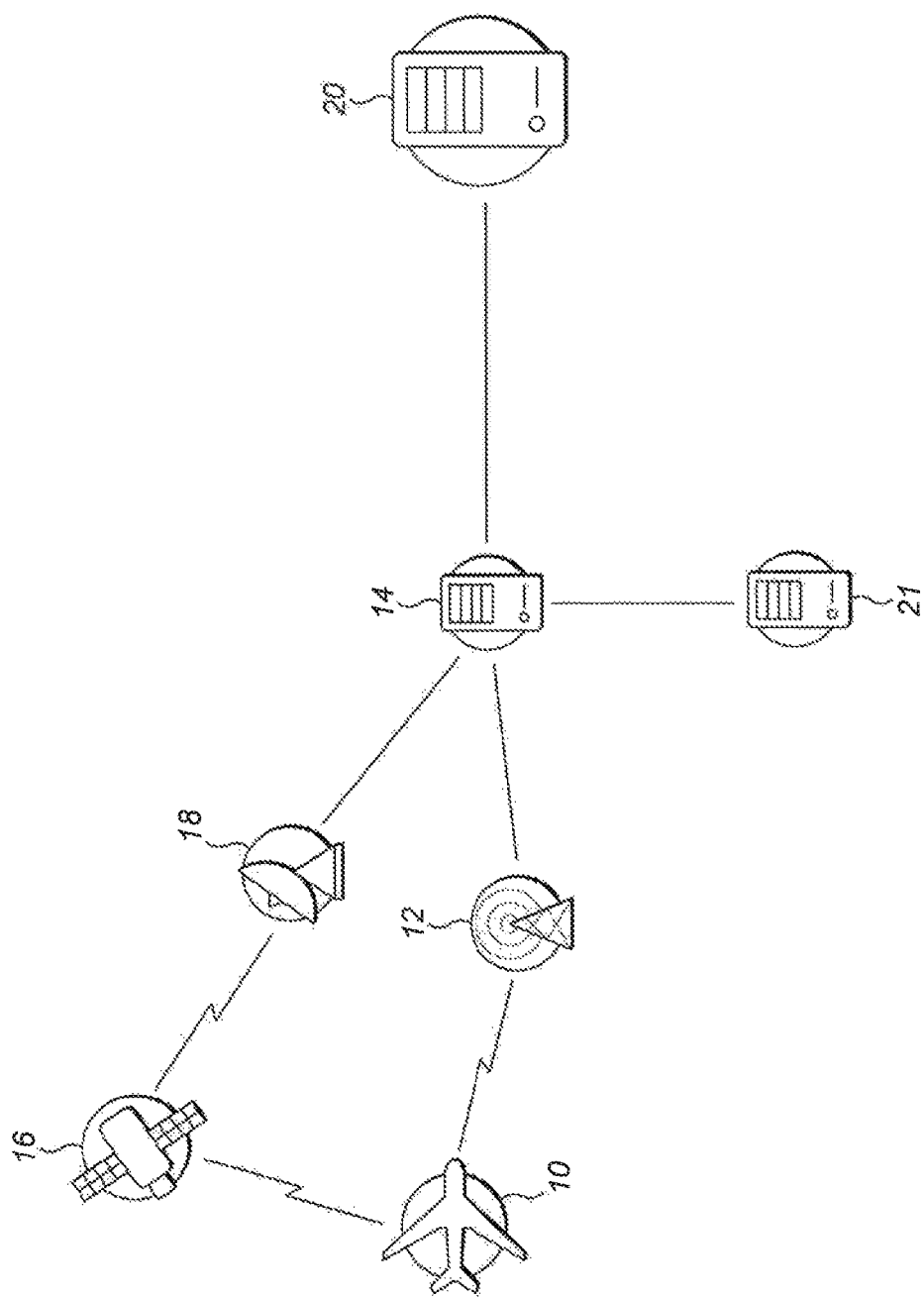
FIG. 1 is a schematic representation of a system according to an embodiment of the invention interacting with the respective data sources.

FIG. 1 shows an aircraft 10 that is equipped with a FANS avionics system to provide a digital data link between the aircraft 10 and one or more users on the ground. The digital data link may transmit messages directly to one or more ACARS ground stations 12, which may then be forwarded through a communications network 14. The communications network may include one or more of a local area network (LAN), a wide area network (WAN), the internet, a mobile telephony communication system or a satellite communication system. Alternatively, the aircraft may transmit the ACARS messages via a satellite link 16; in this case, the ground station would be a satellite ground station 18.

The ACARS messages that are forwarded through the communications network 14 are then sent on to, and collected centrally by, a system 20. These ACARS messages may include FANS messages sent over the ACARS protocol as well as other ACARS messages, such as ACARS aircraft location information reports and OOOI messages as will be described in more detail below. The system 20 is for monitoring the status of an aircraft. Typically the status of the aircraft will be monitored during a flight of the aircraft. In this context, a flight is taken to include ground based activities, such as taxiing, from the moment the aircraft systems are powered up at the origin location to the moment that the aircraft systems are powered down at the destination location. The communications network 14 may also be used to route communications between the aircraft 12 and an Air Navigation Service Provider (ANSP) system 21, or an Air Traffic Controller (ATC) system associated with an ATC facility.

The communications network 14 may be any public, private, wired or wireless network and may comprise any suitable infrastructure, including copper cables, optical cables or fibres, routers, firewalls, switches, gateway computers and edge servers. The ground stations 12 may comprise VHF ground stations or HF ground stations that operate on the VHF or HF radio frequency ranges respectively. The term "ground station" is used herein to refer to any receiver station at ground level. For the avoidance of doubt, these ground stations may include receivers located on ocean platforms, such as oil rigs, or floating vessels, such as tankers or aircraft carriers.

Figure 2:
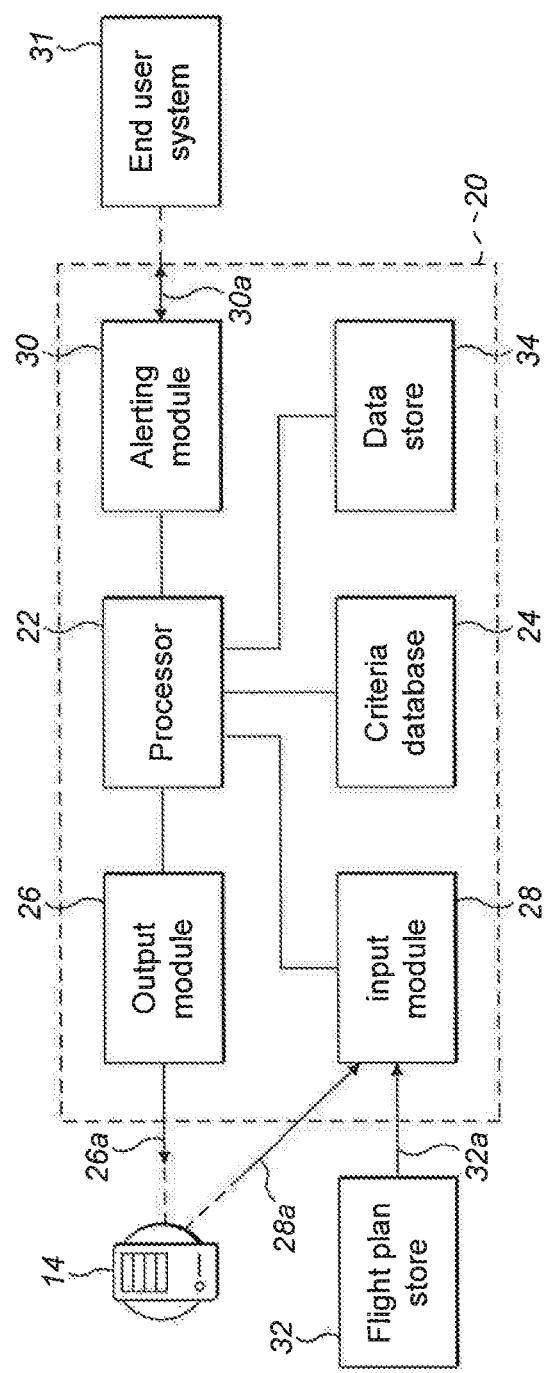
FIG. 2 is a schematic representation of a system according to an embodiment of the invention.

The system 20, according to a first aspect of the invention, will now be described in further detail with reference to FIG. 2. The system 20 comprises a processor 22 that is connected to a criteria database 24, an output module 26, and an input module 28, via respective data lines. The output module 26 is configured to couple to the communications network 14 of FIG. 1, via a connection 26a, such that uplink messages output from the output module 26 may be communicated to the aircraft 10 via one or more ground stations 12 or one or more satellite ground stations 18 using a satellite link 16.

Similarly, the input module 28 is configured to couple to the communications network 14 of FIG. 1, via a connection 28a, such that downlink messages output from the aircraft 10 may be received at the input module 28 via one or more ground stations 12 or one or more satellite ground stations 18 using a satellite link 16. The system further comprises an alerting module 30 that is connected to the processor 22, via a further data line, and configured to output one or more alerts to an end user. The alerting module 30 may be coupled to the end user's end user system 31 via a connection 30a.

Optionally, the input module 28 of the system 20 may further be coupled to a flight plan store 32 via a connection 32a. In this regard, it will be appreciated that the input module 28 may be configured to receive input messages from a plurality of sources and that the messages from each source may be received at a separate input submodule, with the respective input submodules collectively forming the input module 28. The system 20 may optionally further comprise a data store 34. In one embodiment, the data store 34 may be connected to the processor 22 by a data line.

In order to initiate an ADS contract with a given aircraft 10, the processor 22 may send instructions to the output module 26 uniquely identifying the aircraft and indicating at least one report criteria. The one or more report criteria may be retrieved by the processor 22 from the criteria database 24, or alternatively the report criteria may have been provided by the end user system 31, for example via the alerting module 30 and the connection 30a.

The criteria database 24 may be configured to store one or more report criteria for being used to determine the type of ADS contract that should be established with a given aircraft and to configure the parameters of the contract, such as the frequency of the downlink reports. These report criteria may be default report criteria for a given fleet or type of aircraft, or they may be report criteria that relate specifically to a particular flight or specific aircraft and that have previously been provided by the end user system 31.

The report criteria may specify that the ADS contract is a periodic contract, a demand contract or an event contract. A periodic contract allows the end user to specify the time interval at which the aircraft's avionics systems are required to send an ADS-C message reporting information regarding the status of the aircraft. The status of the aircraft may comprise information identifying the location of the aircraft, its speed and direction. In one embodiment, this interval may be between 1 second and 4,096 seconds (i.e. approximately 68 minutes) and in a further embodiment the interval may be between 64 seconds and 4,096 seconds. This interval may be altered during the flight to provide more frequent position information, for example during a given segment of the flight or in the event that concerns are raised regarding the safety of the aircraft.

In one embodiment, when the output module 26 has received the ADS contract details for a given aircraft, the output module 26 may be arranged to process the ADS-C data in order to translate and encapsulate the ADS-C data, which is typically in a bit-orientated data format, in accordance with the ACARS character-oriented communications protocol, which is typically not directly compatible with FANS data. The encapsulated ADS contract details may then be output from the output module 26 as a reporting contract request message via connection 26a and transmitted to the aircraft's avionics via the communications network 14 and the one or more ground stations 12 or one or more satellite ground stations 18 using a satellite link 16. At the aircraft's avionics, the encapsulated message may be translated back into a bit-orientated format and passed to the aircraft's FMS for handling.

The aircraft's FMS can then record the details of the ADS contract and send a contract acknowledgement to the system 20. The aircrafts FMS may then also send the first ADS-C report as a data signal response, in response to the new contact, to the system 20. The data signal response is encoded as a data signal so that is can be transmitted over the data link network. The acknowledgement and the first report may be transmitted in a single downlink message, or alternatively as separate downlink messages from the aircraft's FMS to the system 20 via the one or more ground stations 12 or one or more satellite ground stations 18 using a satellite link 16 and the communications network 14. This downlink message may also be encapsulated in the ACARS communications protocol for transmission.

The downlink messages will be received at system 20 by the input module 28 via connection 28a and the input module 28 may then transmit the messages, i.e. the data signal response, to the processor 22. In one embodiment, the input module may translate the encapsulated message prior to transmitting the message to the processor 22, such that the processor 22 can read the contents of the message. The processor 22 may then store data corresponding to the received data signal response in the data store 34. The data store 34 may be a volatile memory buffer or a cyclic buffer, or alternatively the data store 34 may be a non-volatile memory, such as a hard disk, floppy disk, magnetic tape, solid state drive, storage area network or optical discs.

The processor 22 may then compare the content of the received message with one or more alert criteria held in the criteria database 24 to determine if one or more of the alert criteria have been met. The alert criteria may correspond to the report criteria, as will be discussed in further detail below.

The alert criteria may specify that, in the event that the processor 22 determines that the received message is a connection denial message, the processor 22 should cause the alerting module 30 to generate an alert and the alerting module 30 may be configured to output the alert to an end user system 31 via connection 30a. The alerting module 30 may process the alert to format the alert message such that it is readable by the end user system 31 and encapsulate the alert in a header packet that includes the appropriate destination information for the end user system 31 prior to outputting the alert.

The processor 22 may be configured to retry the ADS-C connection a defined period of time after receiving a connection denial message and this may be configured to repeat a set number of times or until a contract acknowledgement is received. The defined period of time may be set by an instruction from the end user system 31. In one embodiment, the alert criteria may specify that the system 20 will retry the ADS-C connection without generating an alert after receiving a first connection denial message from the aircraft 10. In such an embodiment, the alert criteria may specify that the alert may then be generated if a second or further connection denial message is received from the aircraft 10.

The report criteria may, for example, specify that a periodic contract data signal response should be sent from the aircraft 10 to the system 20 every 60 seconds. In this manner, the report criteria set up an agreement between the aircraft 10 and the aircraft monitoring system 20 regarding when a data signal response will be sent from the aircraft 10 to the aircraft monitoring system 20. Similarly, the alert criteria may specify that an alert should be generated if a data signal response is not received within the period identified by the periodic contract report criteria.

When the processor 22 receives the first data signal response from the aircraft 10, the processor 22 may initiate a timer. Upon receiving a subsequent data signal response, the processor 22 may reset the timer back to zero. In the event that the processor 22 determines that the timer has reached 60 seconds and a subsequent data signal response has not been received, the processor 22 may determine that the alert criteria (and the report criteria) have not been satisfied. Accordingly, the processor 22 may cause the alerting module 30 to output an alert. This alert may be communicated to the end user system 31 via connection 30a.

A demand contract allows a single, one-off, ADS-C periodic report, or data signal response, to be requested from a given aircraft 10 in addition to any periodic contract that is currently being maintained. This type of demand contract report will typically only be requested in response to a specific request received from the end user system 31, for example if the end user system 31 wants to know where a given aircraft 10 is at that moment in time. This may be useful in situations wherein the current periodic contract interval is a comparatively long time and the next periodic contract response is not expected for some time.

An event contract indicates to the aircraft's FMS that an ADS contract data signal response should be transmitted from the aircraft 10 to the system 20 whenever a specific event occurs. For example the event may include a waypoint change event occurring to the next and/or next but one waypoint in the FMS. This would occur due to a flight plan change or a change in a waypoint sequence and any waypoint changes would be notified to the system 20 until the event contract is cancelled.

Alternatively, the specific event may be a level range deviation alert, a lateral deviation alert or a vertical rate change alert. Each of these alerts will only be triggered once and accordingly the system 20 must set up a new periodic contract if a further alert of the same type is desired. The level range deviation alert is triggered when the altitude (or flight level) of the aircraft extends above an upper limit flight level or below a lower limit flight level, these flight level limits are typically defined in the ADS-C event contract.

The lateral deviation alert will be triggered when the actual aircraft location exceeds a given off-route distance threshold from the expected position of the aircraft 10 as defined in the active flight plan for the aircraft; the threshold will typically be defined in the ADS-C event contract. The vertical rate change alert will be triggered when the positive or negative vertical rate of climb or descent is greater than a given threshold.

The applicant has appreciated that these ADS contracts and associated reports may be used by an airline to improve the monitoring of the airline's aircraft 10. Using the above ADS contracts, the system and method of the present invention may provide advanced alerting regarding the status of a monitored aircraft. As stated above, the system may generate an alert if a response required by a ADS-C periodic event contract is not received within the appropriate interval of time defined by the report and alert criteria.

In one embodiment, the processor 22 may allow an additional period of time in excess of the defined interval prior to determining that the periodic report criteria have not been satisfied and generating an alert. For example, if the report criteria of the ADS-C periodic event contract defines that a response message should be sent from the aircraft 10 to the system 20 every 60 seconds, the alert criteria may specify the processor allows the timer to reach 70 seconds since the previous response message without the next response message having been received prior to causing the alerting module 30 to generate an alert. In this manner the alert criteria may allow for an additional 10 second period. This additional period may be a second interval of 10 seconds that starts at the expiry of the first period (i.e. the 60 second period in the above case), or alternatively it may be a second period that runs concurrently with the first period (i.e. a 70 second period in the above case).

This additional time period will allow the system 20 to reduce false alerting and account for small variations in the transmission time of each message from the aircraft 10 to the system 20. This additional period of time may be a fixed period, or alternatively the additional period may be a percentage of the interval defined by the ADS-C periodic event contract.

Similarly, if the system 20 sends an ADS-C demand event contract request to a given aircraft 10, then the system 20 may be configured to generate an alert if a response to the ADS-C demand event contract is not received within a given period of time. For example, this period of time may be 10 seconds, 20 seconds, 1 minute or any other desired time period.

In addition to receiving ADS-C data signal response messages, the system 20 may be configured to receive other ACARS messages from the aircraft 10 via the communications network 14 and the input module 28. For example, the system 20 may receive standard ACARS position reports and/or ACARS reports regarding changes to the major flight phases from the aircraft 10. These major flight phases are typically referred to as OOOI events and may be used to indicate that the aircraft 10 is "Out of the gate", "Off the ground", "On the ground" or "Into the gate". For the avoidance of doubt, the input module 28 of the aircraft monitoring system may also be configured to receive aircraft location information from non-ACARS sources, such as radar data or Automatic Dependent Surveillance Broadcast (ADS-B) data. In embodiments wherein the input module 28 of the system 20 is coupled to the flight plan store 32 via a connection 32a, the system may also be configured to receive a computer flight plan for a given aircraft's flight.

If the processor 22 determines that the aircraft 10 has deviated from the flight plan by more than a defined amount then the processor 22 may be configured to cause the alerting module 30 to generate an alert. This defined amount could be a fixed value or a percentage value. The deviation may be a vertical/flight level deviation (for example, 200 feet or a change of 2 in flight level) and/or a horizontal/lateral deviation (for example, 5 nautical miles). The deviation may be calculated by the processor 22 by comparing aircraft location information received from the aircraft 10 with flight plan data received by the system 20 from the flight plan store 32.

Alternatively, the processor 22 may determine that a flight level (vertical) or lateral (horizontal) deviation has occurred by the receipt of an ADS-C event contract response message indicating a level range deviation event or a lateral deviation event. The level range deviation event and lateral deviation event data signal responses will be determined based on the aircraft active flight plan that is stored in the aircraft's FMS. The aircraft active flight plan may be modified in-flight and accordingly it may vary in comparison to a computer flight plan received by the system 20 from the flight plan store 32. Therefore, deviation alerts may be generated by the system 20 based on the computer flight plan data without an ADS-C event contract response message indicating corresponding deviation, or vice versa. These deviation alerts can enable users to quickly identify aircraft that may have been subject to a re-routing and assess any knock-on effects that this may have on the arrival time of the aircraft and any future flights that the aircraft or its crew are scheduled to embark on.

In one embodiment, the input module 28 may be configured to receive CPDLC messages corresponding to a given aircraft 10 via the communications network 14 and the connection 28a. These CPDLC messages are typically communications between a controller of an ATC service or ANSP and the pilot of the aircraft 10. However, where these communications are transmitted over the communications network 14, copies of these CPDLC messages may be forwarded by the communications network 14 to the system 20.

In such an embodiment, the processor 22 may receive the CPDLC messages corresponding to the aircraft 10 and process the CPDLC messages to determine if a vertical or horizontal deviation of the aircraft 10 has been authorised by a controller in the content of the CPDLC messages, for example if there has been an instruction to climb or descend. If the processor 22 determines that the deviation has been authorised, then the processor 22 may cause the alerting module 30 to output an indication with the deviation alert message to indicate that the deviation was authorised by a controller. Alternatively, the processor 22 may determine that an alert should not be generated by the alerting module 30 if a deviation has been authorised by the controller.

The content of CPDLC messages typically follow a standard format and accordingly the processor 22 may be configured to parse this information and determine the meaning of the messages. The processor 22 may also cause the received CPDLC messages to be stored in the data store 34 for archiving or later retrieval. For example, these CPDLC messages may be provided to the end user system 31 by the alerting module 30 upon the request of a user of the end user system 31.

In one embodiment, the processor 22 may be configured to cause the alerting module 30 to output the content, or a summary of the content, of recently received CPDLC messages with any alerts that are generated by the alerting module 30. In such an embodiment, the system 20 may send the alert to the end user system 31 with the accompanying CPDLC messages such that an end user of the end user system 31 may determine manually if a deviation was authorised in the CPDLC messages. In this case, it may not be necessary for the processor 22 to parse the CPDLC messages or to determine the meaning of the messages.

Preferably, the system 20 may enable a user to define an area of airspace bounded by a shape or polygon. The alert criteria and the processor 22 may then cause the alerting module 30 to generate an alert if a given aircraft's location is determined to enter, or be within, the area bounded by the shape. Alternatively, the alert criteria and the processor 22 may cause the alerting module 30 to generate an alert if the computer flight plan or aircraft active flight plan is determined to intersect the area bounded by the shape.

The shape may be defined by clicking on a series of points on a map, or entering a series of coordinates; these points may then be used to create the outline or boundary of the shape and the shape may further be associated with a given flight level or range of flight levels in order to define a given volume of airspace. The shape may optionally be associated with a start date and time and/or an end date and time. The alert criteria and the processor 22 may cause the alert to be cancelled or reset in the event that the aircraft 10 is determined to have exited the area associated with the shape or if the flight plan is amended such that it no longer intersects the area bounded by the shape.

Alternatively, the shape may be a standard region or airspace, such as a Flight Information Region (FIR) and/or an Upper Information Region (UIR) or it may be defined by an outside source, such as a weather layer from a weather service. The weather layer may indicate an area of bad weather such as a volcanic ash alert, icing conditions or turbulence etc.

If the processor 22 determines that a flight phase change message (such as an out of the gate or off the ground OOOI event message) has been received from an aircraft 10, but that a computer flight plan corresponding to the current flight of the aircraft 10 has not been received from the flight plan store 32 then the alert criteria and the processor 22 may cause the alerting module 30 to generate an alert. This is desirable because, in the absence of a computer flight plan for the flight, some of the other alerting functions will not be functional as they require the processor 22 to compare received aircraft location information with the received computer flight plan in order to determine if an alert should be generated.

A received computer flight plan may include an estimated time of departure (ETD) and an estimated time of arrival (ETA) for the relevant flight of the aircraft 10. If the processor 22 determines that the ETA has expired but that an on the ground OOOI event flight phase change message has not been received from the aircraft 10 then the processor may cause the alerting module 30 to generate an alert. This may indicate to the end user that an aircraft 10 is late and that further investigation or remedial action may be necessary. In one embodiment, the processor 22 may only cause the alerting module 30 to generate an alert after an additional period of time has expired, with the additional period of time commencing at the ETA. For example, an alert may be generated if it is determined that the aircraft if 5 or more minutes late in landing.

If a revised ETA is received from the aircraft 10 during the flight then this revised ETA may be used in place of the computer flight plan ETA. Furthermore, if no ETA is received for a given flight of an aircraft 10 but an off the ground OOOI event flight phase change message has been received, then the processor 22 of the system 20 may determine an ETA for the flight by taking the time offset between the scheduled time of departure and the timestamp of the off the ground OOOI event message and applying the time offset to the scheduled time of arrival.

ADS-C communications also support emergency alerting, whereby a periodic report that is tagged as an emergency report is transmitted from the aircraft 10 to any connected ground systems as a data signal response. This function may be triggered by the crew manually by selecting the ADS-C emergency function or indirectly by triggering a different type of alerting system in the aircraft avionics. If the processor 22 determines that an ADS-C data signal response received at the input module 28 is an emergency report, the alert criteria and the processor 22 may cause the alerting module 30 to generate a corresponding alert to be output to the end user system 31.

The alert criteria and the processor 22 may be configured to only cause the alert to be generated if more than a set number of emergency reports are received, or if the emergency reports are received for more than a given duration of time. This may help to identify (and optionally ignore) transient alerts that may have been triggered accidentally.

If the processor 22 determines that the aircraft has completed a 360 degree turn, the alert criteria may specify that the processor 22 may cause the alerting module 30 to generate an alert to indicate that the aircraft is potentially in a holding pattern. This alert may be cleared by the processor 22 if it is determined that no further 360 degree turns have been detected within a further period of time, for example 5 minutes. This type of alerting would require a relatively short reporting interval such that the 360 degree turn can be accurately plotted. Optionally, the system 20 may receive additional aircraft position data input, such as Automatic Dependent Surveillance Broadcast (ADS-B) position reports. Optionally, a diversion alert may be generated if a diversion message corresponding to a monitored aircraft 10 is received by the system 20.

If the processor 22 determines that an aircraft 10 that is on the ground and on departure, i.e. an out of the gate OOOI event flight phase change message has been received but an off the ground OOOI event flight phase change message has not been received and that the aircraft 10 has exceeded a defined speed and then slowed below that speed, then the alert criteria and the processor 22 may cause the alerting module 30 to generate an alert. This alert may indicate that a rejected take off has occurred. Similarly, if processor 22 determines that an aircraft 10 has descended below a defined altitude (for example, 10,000 feet) and then climbed above the defined altitude by more than a defined amount (for example, 1000 feet), then the alert criteria and the processor 22 may cause the alerting module 30 to generate an alert to indicate that is has been necessary for the aircraft 10 to "go around".

If the ATC or ANSP that monitors the airspace that an aircraft 10 is in is FANS enabled then the ATC or ANSP may have an active data link session with the aircraft 10. Typically, a FANS connection should be established around 30 to 45 minutes prior to entering the airspace of the FANS enabled ANSP.

Figure 3:
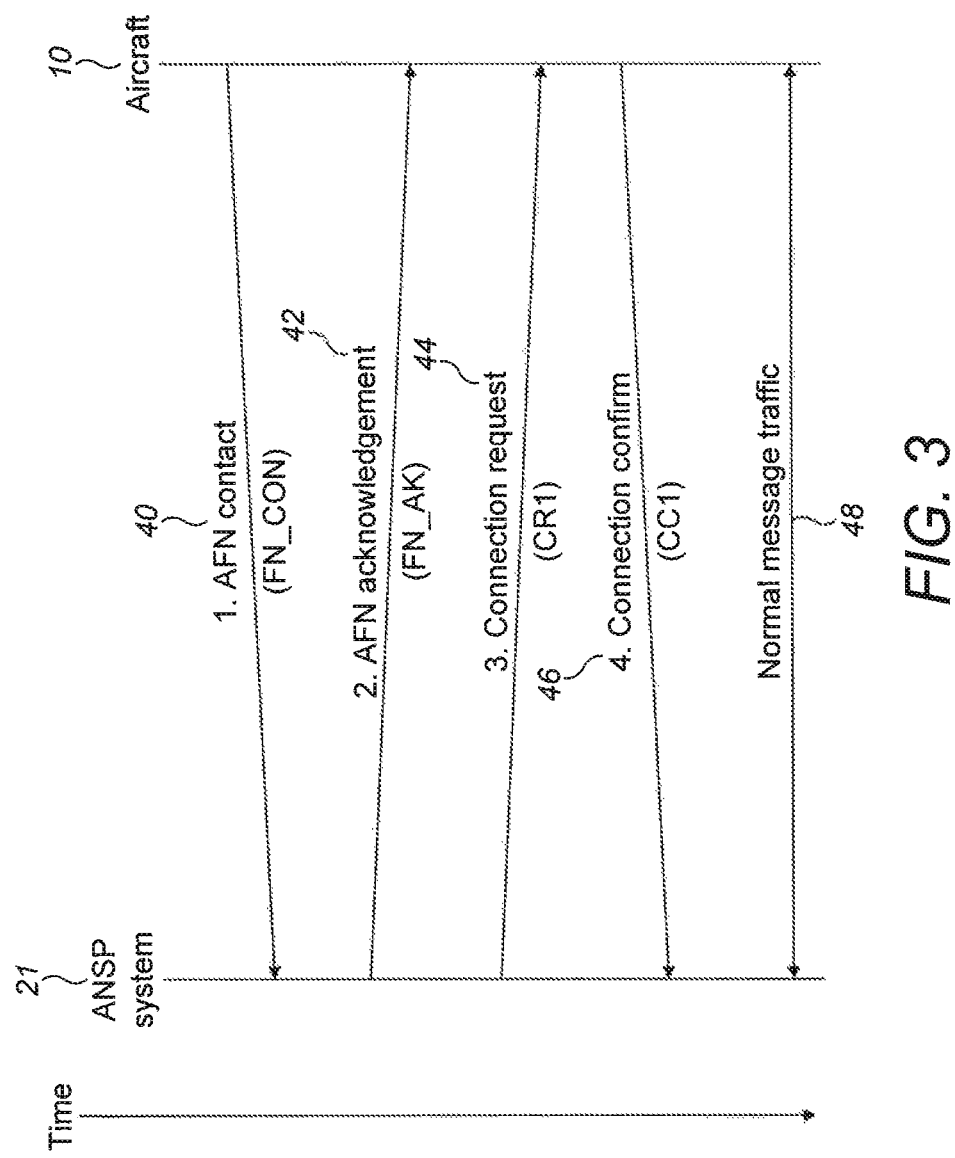
FIG. 3 is a message flow diagram of the process of establishing a FANS session with an ANSP.

The process of establishing a FANS session with an ANSP will now be described with reference to FIG. 3. FIG. 3 illustrates a timeline of messages between an ANSP system 21 and an aircraft 10. This process informs the relevant ANSP of the datalink capabilities of the aircraft 10 and enables the ANSP to correlate the aircraft connection with a filed flight plan.

When no other FANS connection has been established between the aircraft 10 and a previous ANSP, the ANSP system 21 and the aircraft 10 preferably exchange Air Traffic Service Facilities Notification (AFN) messages. This message is the means by which an aircraft 10 may introduce itself to the ANSP so that the ANSP is aware of the aircraft's registration number and the digital data link applications that the aircraft 10 supports. Initially, the pilot causes the aircraft 10 to send an AFN Contact message 40 to the ANSP system 21, the ANSP system will then reply to this message with an AFN Acknowledgement message 42. The AFN Acknowledgement message 42 may also be described as a FANS logon confirmation message.

The ANSP system 21 will then initiate a CPDLC connection by sending a Connection Request message 44 to the aircraft 10, to which the aircraft would typically respond with a Connection Confirm message 46. Once the connection has been established and is active, the bi-directional exchange of CPDLC messages 48 may be carried out. If the connection is lost, then the complete logon procedure must be repeated in order to re-establish the connection.

The communications network 14 may be configured to forward these AFN messages to the system 20 and the input module 28 may be configured to receive these AFN messages. Furthermore, the processor 22 may be configured to determine if AFN message criteria have been satisfied by the received AFN messages and cause the alerting module 30 to generate an alert based on the determination. For example, the AFN message criteria may specify that a given region of airspace is monitored by a FANS enabled ANSP and that the aircraft is expected to have an active FANS session with the ANSP whilst in or approaching that region of airspace. In this manner, the AFN message criteria may serve to specify when given AFN messages are to be expected and under what conditions, such as the absence of an expected AFN message, an alert should be generated.

If the processor 22 determines that an AFN acknowledgement message 42 (FANS logon confirmation message) has not been received after the aircraft 10 has been in FANS enabled airspace for a time period identified by the AFN message criteria then the processor 22 may cause the alerting module 30 to generate an alert. This alert would highlight to the user that an aircraft 10 had not established an active FANS session with an ANSP when it is expected to.

Figure 4:
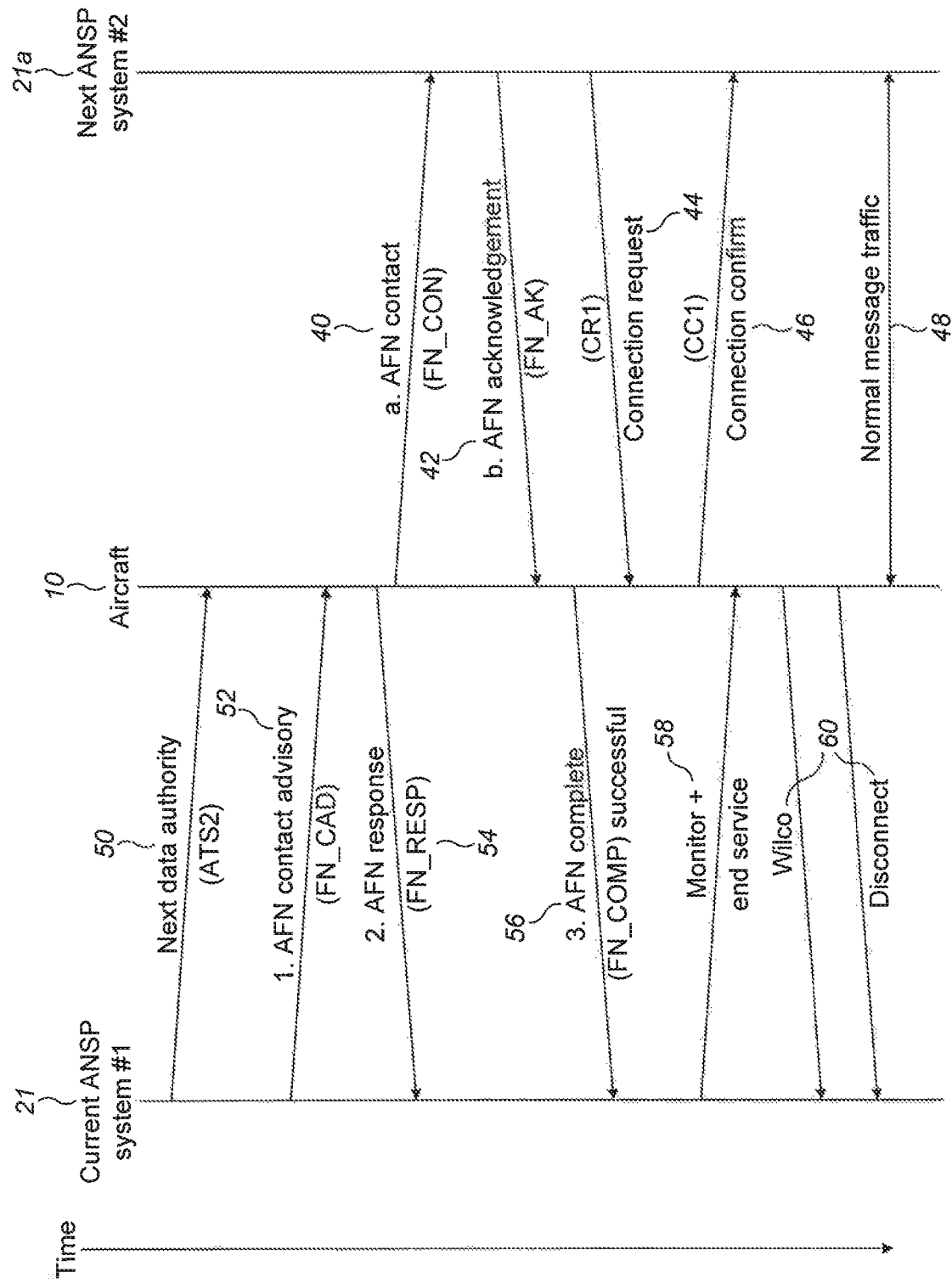
FIG. 4 is a message flow diagram of the process of handing over a FANS session from a current ANSP to a next ANSP.

As the aircraft 10 approaches the boundary between two FANS enabled ANSPs, the current ANSP will instruct the aircraft avionics that a connection is to be established with the next ANSP. This process will be described with reference to FIG. 4, which shows the current ANSP system 21 initiating the process by sending a Next Data Authority message 50 to the aircraft 10, wherein the message identifies the next ANSP system 21a. The current ANSP system 21 may then send an AFN Contact Advisory message 52 to the aircraft 10, which may then be acknowledged by the aircraft 10 with an AFN response 54.

The aircraft 10 may then send an AFN Contact message 40 to the next ANSP system 21a and receive an AFN Acknowledgement message 42 from the next ANSP system 21a. When the aircraft 10 has received the AFN Acknowledgement message 42, it will typically send an AFN Complete message 56 to the current ANSP system 21 to inform the current ANSP that the AFN process has been completed with the next ANSP. The current ANSP may continue to monitor the aircraft 10 until the aircraft is close to the sector boundary of the airspace monitored by the current ANSP, at which point the current ANSP may send an End Service message 58 to the aircraft 10. Optionally, the aircraft 10 may then send Wilko and Disconnect messages 60 to confirm that the CPDLC connection with the ANSP has been terminated.

The next ANSP may initiate a CPDLC connection by sending a Connection Request message 44 to the aircraft 10, to which the aircraft would typically respond with a Connection Confirm message 46. Once the connection has been established and is active, the bi-directional exchange of CPDLC messages 48 may be carried out between the aircraft 10 and the next ANSP system 21a.

If the processor 22 determines that an AFN acknowledgement message 42 (FANS logon confirmation message) has not been received within a given time period of the current ANSP sending an AFN Contact Advisory message 52 to the aircraft 10 then the AFN message criteria and the processor 22 may cause the alerting module 30 to generate an alert. The time period may be identified by the AFN message criteria. This alert would highlight to the user that an aircraft 10 had not established an active FANS session with a next ANSP when it is expected to.

Figure 5:
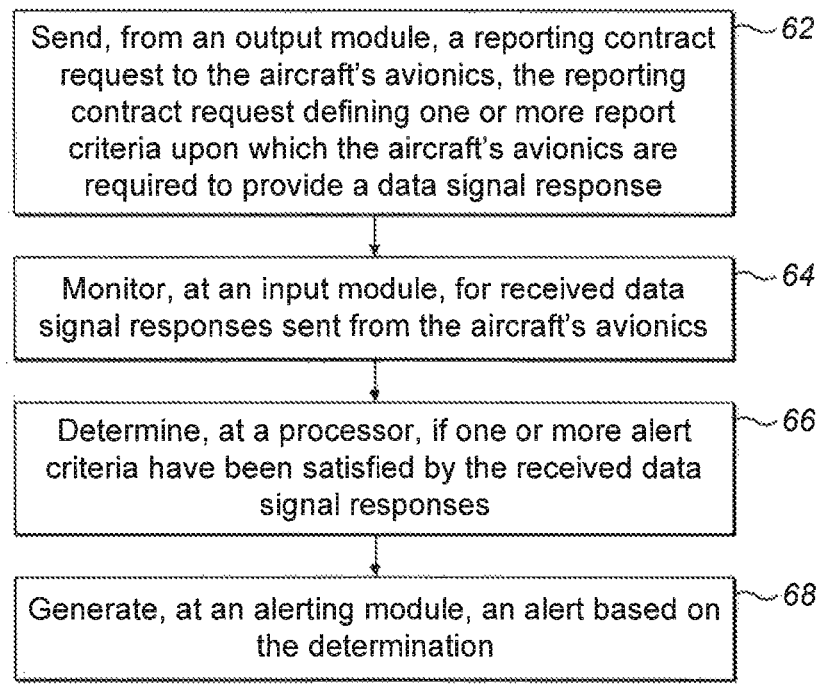
FIG. 5 is a flow diagram showing the main steps performed by an embodiment of the invention.

A second aspect of the invention provides a computerised method for monitoring the status of an aircraft that will now be described with reference to FIG. 5. The method comprises sending 62 a reporting contract request defining one or more report criteria from an output module 26 to the aircraft's avionics. The reporting contract request may define one or more report criteria upon which the aircraft's avionics are required to provide a data signal response to an aircraft monitoring system. These data signal responses are then monitored for and received 64 at an input module 28, of the aircraft monitoring system, from the avionics of the aircraft 10. The reporting contract will typically be an ADS contract and the report criteria associated with the reporting contact request may be periodic, event or demand based criteria. The method further comprises determining 66 at a processor 22 if one or more alert criteria have been satisfied by received data signal responses. For example, the report criteria may define a periodic interval at which the aircraft's avionics are required to provide a response and an alert may be generated 68 if the processor 22 determines that a required response has not been received during an interval defined by one or more alert criteria. As described above, the interval defined by the alert criteria may be the same as or longer than the periodic interval defined by the report criteria.

Preferably, the responses comprise aircraft location information corresponding to the aircraft 10. Furthermore, the one or more report criteria and the one or more alert criteria may be received from a criteria database 24. The computerised method may comprise determining if an ACARS flight phase change message, such as an 'out' or 'off' OOOI event message, has been received for a given aircraft's flight and whether flight plan data has been received for that flight. If it is determined by the processor 22 that a flight phase change message has been received but that corresponding flight plan data has not be received then the method may comprise generating an alert to bring this to the attention of the end user system 31 or an end user. This enables the user to become aware that an aircraft 10 is about to, or has, taken off but that the method will not be able to provide alerts that require a comparison of responses received from an aircrafts avionics with the flight plan corresponding to that aircraft's current flight.

Figure 6:
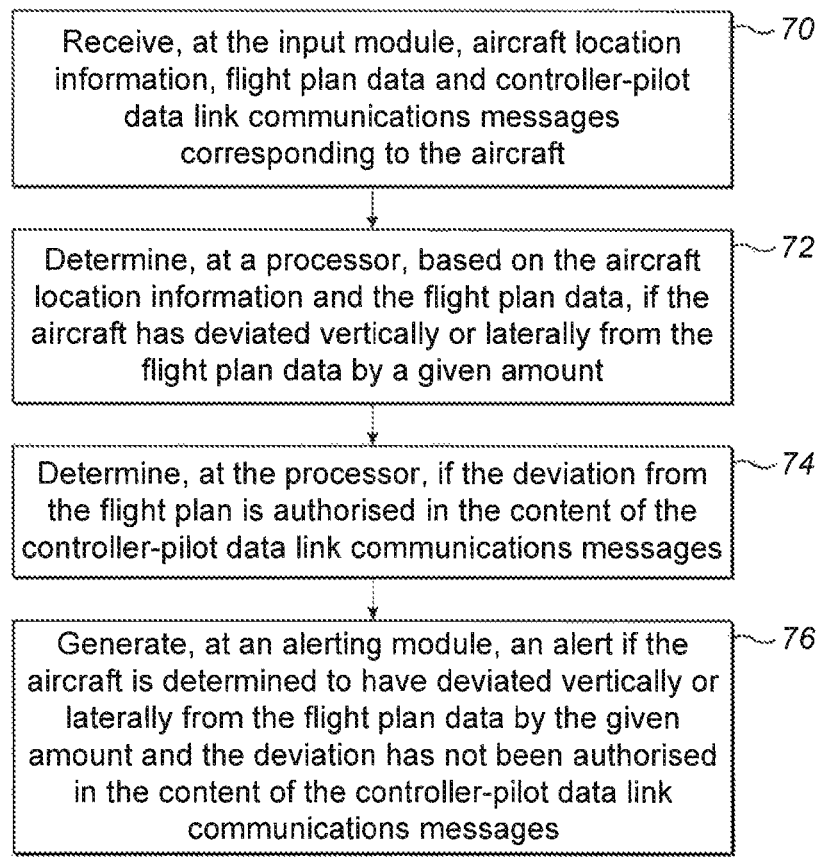
FIG. 6 is a flow diagram showing additional steps that may be performed by an embodiment of the invention.

As shown in FIG. 6, the computerised method may additionally comprise receiving 70, at the input module, aircraft location information, flight plan data and Controller-Pilot Data Link Communications messages corresponding to the aircraft 10 and determining 72, based the aircraft location information and the flight plan data, if the aircraft has deviated vertically or laterally from the flight plan data by a given amount. If the aircraft 10 is determined to have deviated by the given amount, or more, then the method further comprises determining 74, at the processor 22, if the deviation from the flight plan is authorised in the content of the Controller-Pilot Data Link Communications messages.

If the aircraft 10 is determined to have deviated vertically or laterally from the flight plan data by the given amount and the deviation has not been authorised in the content of the Controller-Pilot Data Link Communications messages then the method comprises generating 76, at an alerting module 30, an alert.

In further embodiments, the method may comprise generating an alert if the aircraft location information indicates than the aircraft 10 is in a given region of airspace. Optionally, the alert may be generated if the flight plan data indicates that aircraft is estimated to intersect such a given region of airspace in the future.

The method may further comprise processing received messages to determine if a received data signal response is an emergency report or a connection denial message. If a received data signal response is determined by the method to be an emergency report or a connection denial message then an alert is preferably generated, at the alerting module. This will highlight emergency situations or situations wherein a FANS connection has been unsuccessful respectively.

The method may further comprise storing received CPDLC messages and/or generated alerts in a data store 34, wherein the CPDLC messages and/or generated alerts may be retrieved from the data store and provided to a user upon a user request.

Figure 7:
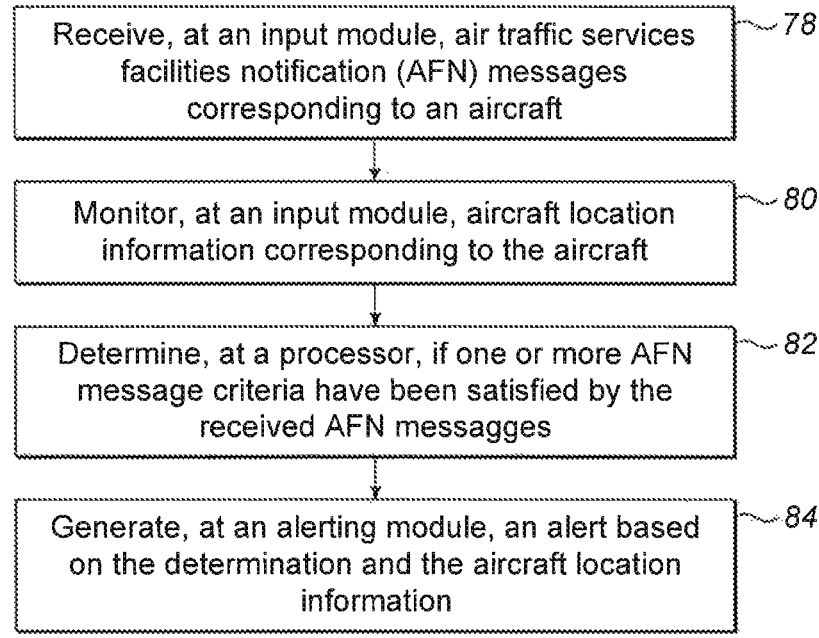
FIG. 7 is a flow diagram showing the main steps performed by an alternative embodiment of the invention.

With reference to FIG. 7, a computerised method for monitoring the status of an aircraft may receive 78, at the input module, Air Traffic Services Facilities Notification (AFN) messages corresponding to the aircraft and receive 80, at the input module, aircraft location information corresponding to the aircraft. The method of FIG. 7 further determines 82, at a processor, if one or more AFN message criteria have been satisfied by the received AFN messages and generates 84, at an alerting module, an alert based on the determination and the aircraft location information.

For example, the AFN message criteria may specify that a given region or sector of airspace is monitored by a FANS enabled ANSP and that accordingly it would be expected that a FANS enabled aircraft entering that sector of airspace would have an active FANS session with the relevant ANSP. If a FANS logon confirmation message (AFN Acknowledgement message) has not been received by the time the aircraft enters the sector, or after the aircraft has been in the sector for a given time period, then the method may involve generating a corresponding alert.

Similarly, if a FANS enabled aircraft 10 has an active FANS session with the ANSP of the sector that the aircraft is currently in and the aircraft is approaching another FANS enabled ANSP, it would be expected that the current ANSP 21 would send an AFN Contact Advisory message to the aircraft 10 to identify the next ANSP 21a and initiate the automatic handover process.

If the method determines that an AFN Contact Advisory message has been sent to the aircraft 10, but that a FANS logon confirmation message has not been received within a given time period, then the AFN message criteria may specify that the method should proceed to generate an appropriate alert in order to highlight to the user that that automatic handover process between ANSPs does not appear to have been successful.

Each block in the flowcharts described above may represent a module comprising one or more executable computer instructions, or a portion of an instruction, for implementing the logical function specified in the block. The order of blocks in the diagram is only intended to be illustrative of an example. In alternative implementations, the logical functions illustrated in particular blocks may occur out of the order noted in the figures. For example, the processed associated with two blocks may be carried out simultaneously or, depending on the functionality, in the reverse order. Each block in the flowchart may be implemented in software, hardware or a combination of software and hardware.

Front end software may be provided to facilitate the interface between the user of the end user system 31 and the system 20. The front end software may provide a geographical mapping display with monitored aircraft depicted with corresponding icons. The front end software may display visual and/or audible alerts to the end user when a generated alert is output by the alerting module 30. Events such as AFN logons and connection denial messages may be shown visually on the geographical mapping display at the location that the event occurred.

A graphical user interface of the front end software may also allow the user to review alert information, cancel, ignore or delete a given alert or retrieve CPDLC messages exchanged around the time of the alert or the event that caused the alert to be generated. In one embodiment, this information may be accessed by clicking on the icon corresponding to a given aircraft 10. Furthermore, the front end software may comprise a configurable administration function that allows the end user to tune the parameters of an ADS contract in order to adaptively balance the cost and performance impacts of the corresponding ACARS messaging for a given flight or aircraft 10.

The graphical user interface may include an icon associated with a monitored aircraft 10 or the icon for the aircraft may be a specified colour to indicate that the aircraft has an active FANS session. Furthermore, position reports for each aircraft 10 may be identified by their source, for example as ADS-C position information rather than standard ACARS position information or any other data source that is included, such as ADS-B or radar data. It will be appreciated that different colours may be used to identify the data source of a given item of position information for an aircraft 10.

The invention claimed is:

1. A computerised method for monitoring the status of an aircraft comprising:
sending, from an output module of an aircraft monitoring system, a reporting contract request to the aircraft's avionics, the reporting contract request defining one or more report criteria upon which the aircraft's avionics are required to provide a data signal response to the aircraft monitoring system, wherein the one or more report criteria define a first interval at which the aircraft's avionics are required to provide a data signal response;
monitoring, at an input module of the aircraft monitoring system, for a received data signal response sent from the aircraft's avionics to the aircraft monitoring system;
determining, at a processor of the aircraft monitoring system, if one or more alert criteria have been satisfied by received data signal responses, wherein the one or more alert criteria define a second interval and further wherein an alert is generated, at an alerting module of the aircraft monitoring system, in the absence of a required data signal response being received during the first or second interval; and
generating, at the alerting module of the aircraft monitoring system, an alert based on the determination.

2. A The computerised method according, to claim 1, wherein the report criteria indicates an immediate data signal response is required from the aircraft's avionics and wherein an alert is generated, at the alerting module of the aircraft monitoring system, in the absence of a data signal response being received within an interval defined by the alert criteria.

3. A The computerised method according to claim 1, wherein the one or more report criteria and the one or more alert criteria are received from a criteria database of the aircraft monitoring system and wherein the data signal response comprises aircraft location information corresponding to the aircraft.

4. A computerised method for monitoring the status of an aircraft comprising:
sending, from an output module of an aircraft monitoring system, a reporting contract request to the aircraft's avionics, the reporting contract request defining one or more report criteria upon which the aircraft's avionics are required to provide a data signal response to the aircraft monitoring system, wherein:
the one or more report criteria are received from a criteria database of the aircraft monitoring system; and
the data signal response comprises aircraft location information corresponding to the aircraft;
monitoring, at an input module of the aircraft monitoring system, for a received data signal response sent from the aircraft's avionics to the aircraft monitoring system, wherein:
the input module of the aircraft monitoring system is configured to receive flight plan data and ACARS data corresponding to the aircraft; and
an alert is generated, at the alerting module of the aircraft monitoring system, if it is determined that a flight phase change message corresponding to the aircraft has been received but flight plan data corresponding to the aircraft has not been received;
determining, at a processor of the aircraft monitoring system, if one or more alert criteria have been satisfied by received data signal responses, wherein the one or more alert criteria are received from the criteria database of the aircraft monitoring system; and
generating, at an alerting module of the aircraft monitoring system, an alert based on the determination.

5. The computerised method according to claim 3, further comprising: receiving, at the input module of the aircraft monitoring system, flight plan data corresponding to the aircraft; wherein an alert is generated, at the alerting module of the aircraft monitoring system, if the aircraft location information is determined to deviate vertically or laterally from the flight plan data by a given amount.

6. A computerised method for monitoring the status of an aircraft comprising:
sending, from an output module of an aircraft monitoring system, a reporting contract request to the aircraft's avionics, the reporting contract request defining one or more report criteria upon which the aircraft's avionics are required to provide a data signal response to the aircraft monitoring system, wherein:
the one or more report criteria are received from a criteria database of the aircraft monitoring system; and
the data signal response comprises aircraft location information corresponding to the aircraft;
monitoring, at an input module of the aircraft monitoring system, for a received data signal response sent from the aircraft's avionics to the aircraft monitoring system;
determining, at a processor of the aircraft monitoring system, if one or more alert criteria have been satisfied by received data signal responses, wherein the one or more alert criteria are received from the criteria database of the aircraft monitoring system;
generating, at an alerting module of the aircraft monitoring system, an alert based on the determination;
receiving, at the input module of the aircraft monitoring system, flight plan data corresponding to the aircraft;
wherein the alert that is generated at the alerting module of the aircraft monitoring system is generated if the aircraft location information is determined to deviate vertically or laterally from the flight plan data by a given amount; and
receiving, at the input module of the aircraft monitoring system, Controller-Pilot Data Link Communications (CPDLC) messages corresponding to the aircraft;
wherein the alert is only generated by the alerting module of the aircraft monitoring system if the deviation from the flight plan data is determined, by the processor, not to be authorised in the content of the CPDLC messages.

7. The computerised method according to claim 3, further comprising: receiving, at the input module of the aircraft monitoring system, flight plan data corresponding to the aircraft; wherein an alert is generated, at the alerting module of the aircraft monitoring system, if the aircraft is determined or estimated to intersect a given region of airspace.

8. The computerised method according to claim 7, wherein the given region of airspace is determined by a user selection or by a weather alert.

9. The computerised method according to claim 7, wherein an alert is generated, at the alerting module of the aircraft monitoring system, if it is determined, at the processor, that a received data signal response is an emergency report.

10. The computerised method according to claim 1, further comprising: receiving, at the input module of the aircraft monitoring system, Controller-Pilot Data Link Communications (CPDLC) messages corresponding to the aircraft; and storing the CPDLC messages in a data store; wherein the CPDLC messages are provided to a user upon a user request.

11. The computerised method according to claim 1, wherein an alert is generated if the data signal response to the reporting contract request is determined, at the processor of the aircraft monitoring system, to be a connection denial message.

12. The computerised method according to claim 1, wherein the reporting contract request and the corresponding data signal response conform to an Automatic Dependent Surveillance Contract.

13. The computerised method according to claim 1, wherein the alerts that have been generated at the alerting module of the aircraft monitoring system are stored in a data store and are provided to a user upon a user request.

14. A computerised method for monitoring the status of an aircraft comprising:
sending, from an output module of an aircraft monitoring system, a reporting contract request to the aircraft's avionics, the reporting contract request defining one or more report criteria upon which the aircraft's avionics are required to provide a data signal response to the aircraft monitoring system, wherein:
the one or more report criteria are received from a criteria database of the aircraft monitoring system; and
the data signal response comprises aircraft location information corresponding to the aircraft;
monitoring, at an input module of the aircraft monitoring system, for a received data signal response sent from the aircraft's avionics to the aircraft monitoring system;
determining, at a processor of the aircraft monitoring system, if one or more alert criteria have been satisfied by received data signal responses, wherein the one or more alert criteria are received from the criteria database of the aircraft monitoring system;
receiving, at the input module, Air Traffic Services Facilities Notification (AFN) messages corresponding to the aircraft;
determining, at the processor, if one or more AFN message criteria have been satisfied by the received AFN messages; and
generating, at the alerting module, an alert based on the determinations.

15. A computerised method for monitoring the status of an aircraft comprising:
monitoring, at an input module of an aircraft monitoring system, for Air Traffic Services Facilities Notification (AFN) messages corresponding to the aircraft;
receiving, at the input module, aircraft location information corresponding to the aircraft;
determining, at a processor of the aircraft monitoring system, if one or more AFN message criteria have been satisfied by the received AFN messages, wherein the one or more AFN message criteria identify a time period for receiving a Future Air Navigation System (FANS) logon confirmation message; and
generating, at an alerting module of the aircraft monitoring system, an alert based on the determination and the aircraft location information, wherein the alert is generated at the alerting module if the FANS logon confirmation message has not been received after the aircraft has been in FANS enabled airspace for the identified time period.

16. A computerised method for monitoring the status of an aircraft comprising:
monitoring, at an input module of an aircraft monitoring system, for Air Traffic Services Facilities Notification (AFN) messages corresponding to the aircraft;
receiving, at the input module, aircraft location information corresponding to the aircraft;
determining, at a processor of the aircraft monitoring system, if one or more AFN message criteria have been satisfied by the received AFN messages, wherein the one or more AFN message criteria identify a time period for receiving a FANS logon confirmation message; and
generating, at an alerting module of the aircraft monitoring system, an alert based on the determination and the aircraft location information, wherein the alert is generated, at the alerting module, if the FANS logon confirmation message has not been received within the identified time period from an AFN contact advisory message having been sent to the aircraft.

17. A system for monitoring the status of an aircraft comprising:
an output module configured to send a reporting contract request to the aircraft's avionics, wherein the reporting contract request defines one or more report criteria upon which the aircraft's avionics are required to provide a data signal response to the system, wherein the one or more report criteria define a first interval at which the aircraft's avionics are required to provide a data signal response;
an input module configured to receive data signal responses sent from the aircraft's avionics to the system;
a processor configured to determine if one or more alert criteria have been satisfied by received data signal responses, wherein the one or more alert criteria define a second interval and further wherein an alerting module is configured to generate an alert in the absence of the data signal response being received during the first or second interval; and
the alerting module, wherein the alerting module is configured to generate an alert based on the determination.

18. The system according to claim 17, wherein the report criteria indicates an immediate data signal response is required from the aircraft's avionics and wherein the alerting module is configured to generate an alert in the absence of a data signal response being received within an interval defined by the alert criteria.

19. The system according to claim 17, wherein the data signal responses comprise aircraft location information corresponding to the aircraft.

20. A system for monitoring the status of an aircraft comprising:
an output module configured to send a reporting contract request to the aircraft's avionics, wherein the reporting contract request defines one or more report criteria upon which the aircraft's avionics are required to provide a data signal response to the system;
an input module configured to receive data signal responses sent from the aircraft's avionics to the system, wherein the data signal responses comprise aircraft location information corresponding to the aircraft;
a processor configured to determine if one or more alert criteria have been satisfied by received data signal responses; and
an alerting module configured to generate an alert based on the determination, wherein the alerting module is further configured to generate an alert if it is determined that a flight phase change message corresponding to the aircraft has been received but flight plan data corresponding to the aircraft has not been received.

21. The system according to claim 19, wherein the input module is further configured to receive flight plan data corresponding to the aircraft; and wherein the alerting module is configured to generate an alert if the processor determines that aircraft location information has deviated vertically or laterally from the flight plan data by a given amount.

22. A system for monitoring the status of an aircraft comprising:
   an output module configured to send a reporting contract request to the aircraft's avionics, wherein the reporting contract request defines one or more report criteria upon which the aircraft's avionics are required to provide a data signal response to the system;
   an input module configured to receive data signal responses sent from the aircraft's avionics to the system, wherein:
      the input module is further configured to receive Controller-Pilot Data Link Communications (CPDLC) messages corresponding to the aircraft;
      the input module is further configured to receive flight plan data corresponding to the aircraft; and
      the data signal responses comprise aircraft location information corresponding to the aircraft;
   a processor configured to determine if one or more alert criteria have been satisfied by received data signal responses; and
   an alerting module configured to generate an alert based on the determination, wherein:
      the alerting module is further configured to generate an alert if the processor determines that aircraft location information has deviated vertically or laterally from the flight plan data by a given amount; and
      the alerting module is further configured to generate the alert only if the deviation from the flight plan data is determined by the processor not to be authorised in the content of the CPDLC messages.

23. The system according to claim 19, wherein the input module is further configured to receive flight plan data corresponding to the aircraft and wherein the alerting module is configured to generate an alert if the processor determines or estimates that the aircraft will intersect a given region of airspace.

24. The system according to claim 23, wherein the definition of the given region of airspace is received from a user selection or a bad weather alert.

25. The system according to claim 17, wherein the alerting module is configured to generate an alert if the processor determines that a received data signal response is an emergency report.

26. The system according to claim 17, wherein the input module is further configured to receive Controller-Pilot Data Link Communications (CPDLC) messages corresponding to the aircraft; and wherein the processor is further configured to store the CPDLC messages in a data store and to provide the CPDLC messages to a user upon a user request.

27. The system according to claim 17, wherein the alerting module is further configured to generate an alert if the data signal response to the reporting contract request is determined by the processor to be a connection denial message.

28. The system according to claim 17, wherein the reporting contract requests, that the output module is configured to send, and the corresponding responses, that the input module is configured to receive, conform to an Automatic Dependent Surveillance Contract.

29. The system according to claim 17, further comprising a data store, wherein the processor is further configured to store the alerts that have been generated in the data store and to provide the alerts that have been generated to a user upon a user request.

30. A system for monitoring the status of an aircraft comprising:
   an output module configured to send a reporting contract request to the aircraft's avionics, wherein the reporting contract request defines one or more report criteria upon which the aircraft's avionics are required to provide a data signal response to the system;
   an input module configured to receive data signal responses sent from the aircraft's avionics to the system, wherein:
      the input module is further configured to receive Air Traffic Services Facilities Notification (AFN) messages corresponding to the aircraft; and
      the data signal responses comprise aircraft location information corresponding to the aircraft;
   a processor configured to determine if one or more alert criteria have been satisfied by received data signal responses; and
   an alerting module configured to generate an alert based on the determination, wherein the alerting module is further configured to generate an alert if the processor determines that an AFN confirmation message has not been received when expected based on the aircraft location information.

31. A system for monitoring the status of an aircraft comprising:
   an input module configured to receive Air Traffic Services Facilities Notification (AFN) messages corresponding to the aircraft and aircraft location information corresponding to the aircraft;
   a processor configured to determine if one or more AFN message criteria have been satisfied by the received AFN messages, wherein the one or more AFN message criteria identify a time period for receiving a FANS logon confirmation message; and
   an alerting module configured to generate an alert based on the determination and the aircraft location information, wherein the alerting module is further configured to generate an alert if the FANS logon confirmation message has not been received after the aircraft has been in FANS enabled airspace for the identified time period.

32. A computerised method for monitoring the status of an aircraft comprising:
   an input module configured to receive Air Traffic Services Facilities Notification (AFN) messages corresponding to the aircraft and aircraft location information corresponding to the aircraft;
   a processor configured to determine if one or more AFN message criteria have been satisfied by the received AFN messages, wherein the one or more AFN message criteria identify a time period for receiving a FANS logon confirmation message; and
   an alerting module configured to generate an alert based on the determination and the aircraft location information, wherein the alerting module is configured to generate an alert if the FANS logon confirmation message has not been received within the identified time period from an AFN contact advisory message having been sent to the aircraft.

\* \* \* \* \*